US007385939B2

(12) United States Patent  
Duncan et al.

(10) Patent No.: US 7,385,939 B2  
(45) Date of Patent: Jun. 10, 2008

(54) NETWORK MANAGEMENT APPARATUS AND METHOD FOR DETERMINING THE TOPOLOGY OF A NETWORK

(75) Inventors: Robert James Duncan, Edinburgh (GB); Simon Peter Valentine, Hertfordshire (GB); Daniel Simon Ginger, Hertfordshire (GB); Hamish Donald Stuart Martin, Edinburgh (GB)

(73) Assignee: 3Com Corporation, Marlborough, MA (US)

( * ) Notice: Subject to any disclaimer, the term of this patent is extended or adjusted under 35 U.S.C. 154(b) by 1201 days.

(21) Appl. No.: 09/897,525

(22) Filed: Jul. 2, 2001

(65) Prior Publication Data

US 2002/0154606 A1 Oct. 24, 2002

(30) Foreign Application Priority Data

Feb. 19, 2001 (GB) ................................ 0104026.0

(51) Int. Cl.  
*H04L 12/28* (2006.01)

(52) U.S. Cl. ...................................... 370/256; 370/400

(58) Field of Classification Search ................ 370/254, 370/255, 256, 401, 402  
See application file for complete search history.

(56) References Cited

U.S. PATENT DOCUMENTS

| 6,081,512 | A * | 6/2000 | Muller et al. ................ 370/256 |
| 6,188,694 | B1 * | 2/2001 | Fine et al. .................... 370/402 |
| 6,628,624 | B1 * | 9/2003 | Mahajan et al. ............. 370/256 |
| 6,678,241 | B1 * | 1/2004 | Gai et al. ..................... 370/216 |
| 6,765,881 | B1 * | 7/2004 | Rajakarunanayake ....... 370/256 |
| 6,801,506 | B1 * | 10/2004 | Dey ............................. 370/256 |

FOREIGN PATENT DOCUMENTS

EP 0684716 5/1994

OTHER PUBLICATIONS

"Distributed Tree Maintenance", IBM Technical Disclosure Bulletin, vol. 35, No. 1A, Jun. 1992, pp. 93-98.  
"Distributed Tree Maintenance", IBM Technical Disclosure Bulletin, vol. 35, No. 1B, Jun. 1992, pp. 16-18.  
Decker et al., "Definitions Of Managed Objects For Bridges", RFC: 1493, Jul 1993, pp. 1-34.  
Graaf et al., "Definitions of Managed Objects for IEEE 802.3 Repeater Devices using SMIv2", RFC: 2108, Feb. 1997, pp. 1-82.  
IEEE Standard For Information Technology, "Part 2: Logical Link Control", 802.2, 1998, pp. i-239.  
IEEE Standard For Information Technology, "Part 3: Carrier Sense Multiple Access With Collision Detection (CSMA/CD) Acess Method And Physical Layer Specifications", 802.3, 2000, pp. i-1515.

* cited by examiner

*Primary Examiner*—Edan Orgad  
*Assistant Examiner*—Jung Park  
(74) *Attorney, Agent, or Firm*—McDonnell Boehnen Hulbert & Berghoff

(57) ABSTRACT

A network management apparatus and method for determining the topology of a network in which a Spanning-Tree protocol is implemented, is disclosed in which address table data is obtained from the ports of the core network devices on the network, and the identity of the ports of the core network devices are determined. Spanning-Tree protocol information is obtained from the core network devices and used to process the address table data to remove data relating to ports having links which are inactive. The topology of the network is then determined using the processed data by first selecting one of the core network devices as a root network device, and then using the processed address table data to build a network tree from the selected root device.

13 Claims, 4 Drawing Sheets

NETWORK MANAGEMENT APPARATUS AND METHOD FOR DETERMINING THE TOPOLOGY OF A NETWORK

BACKGROUND OF THE INVENTION

1. Field of the Invention

The present invention relates generally to network management systems and more particularly to a network management apparatus and method capable of determining the topology of a network.

2. Description of the Related Art

The following description is concerned with a data communications network, and in particular a local area network (LAN), but it will be appreciated that the present invention has more widespread applicability to other managed communications systems and networks including wide area networks (WANs) and wireless communications networks.

Data communications networks typically comprise a plurality of network devices (computers, peripherals and other electronic devices) capable of communicating with each other by sending and receiving data packets in accordance with predefined network protocols. Each network device is connected by at least one port to the network media, which in the case of a LAN network may be coaxial cable, twisted pair cable or fibre optic cable. Each device on the network typically has hardware for media access control (MAC) with its own unique MAC address. Data packets are sent and received in accordance with the MAC protocol (e.g. CSMA/CD protocol as defined by the standard IEEE 802.2, commonly known as Ethernet). Data packets transmitted using the MAC protocol identify the source MAC address (i.e. the MAC address of the device sending the data packet) and the destination MAC address (i.e. the MAC address of the device for which the data packet is destined) in the header of the data packet.

A network is generally configured with core devices having a plurality of ports, which can be used to interconnect a plurality of media links on the network. Such devices include hubs, repeaters, routers and switches which forward data packets received at one port to one or more of its other ports, depending upon the type of device. For example, a switch forwards a data packet, received at one port, only to a port known to be connected to the destination device specified in the data packet. Such core devices can either be managed or unmanaged.

A managed device is capable of monitoring data packets passing through its ports. For example, a managed device can learn the physical or MAC addresses of the devices connected to its ports by monitoring the source address of data packets passing through the respective ports. Identified source addresses transmitted from a port of a managed network device, such as a router, hub, repeater or switch, are stored in a respective "address table" associated with the port, as described further below.

Managed devices additionally have the capability of communicating using a management protocol such as the Simple Network Management Protocol (SNMP), as described in more detail below. Whilst the following description is concerned with the SNMP management protocol, the skilled person will appreciate that the invention is not limited to use with SNMP, but can be applied to managed networks using other network management protocols.

SNMP defines agents, managers and MIBs (where MIB is Management Information Base), as well as various predefined messages and commands for communication of management data. An agent is present in each managed network device and stores management data and responds to requests from the manager. A manager is present within the network management station of a network and automatically interrogates the agents of managed devices on the network using various SNMP commands, to obtain information suitable for use by the network administrator, whose function is described below. A MIB is a managed "object" database which stores management data obtained by managed devices and is accessible to agents for network management applications.

It is becoming increasingly common for an individual, called the "network administrator", to be responsible for network management, and his or her computer system or workstation is typically designated the network management station. The network management station incorporates the manager, as defined in the SNMP protocol, i.e. the necessary hardware, and software applications to retrieve data from MIBs by sending standard SNMP requests to the agents of managed devices on the network.

Network management software applications are known which can determine the topology of a network, i.e. the devices on the network and how they are linked together. In order to determine the network topology, the application retrieves MIB data from the managed devices on the network, which can provide information about the devices connected to the managed devices, for instance the aforementioned "address tables". MIB data retrieved from managed devices can also provide information about device type, device addresses and details about the links. Using such data, the application can usually determine the topology of the entire network.

An example of a known network management software application capable of determining network topology is the 3Com® Network Supervisor available from 3Com Corporation of Santa Clara, Calif., USA.

This system, and other similar systems, determines the topology of the network by building a "network tree". In particular a network device or "node" is selected as a "root node" (which is typically a managed switch or bridge) and the system uses the MIB data to determine the identity of all the "child nodes" of each of the ports of a root node.

The child nodes of a given port are the devices, the addresses of which the port has learnt by monitoring the source addresses of data packets passing through the port. In other words, the child nodes are network devices which are connected on a "branch" of the network to the relevant port, and which have sent data packets to network devices on other branches of the network through the root device.

The process is then repeated for each of the child nodes, to determine which nodes are children of each child node, their orientation with respect to each other and thus the structure of the branch. This process builds up the "network tree". More details of the manner of determining network topology in this way can be found in RFC 2108 "Definitions of Managed Objects for IEEE 802.3 Repeater Devices using SMIv2", which is incorporated herein by reference.

A problem with this method of determining network topology is encountered when the topology of a network is not a "tree", but includes a "loop". A loop is formed when an additional link is introduced in the network topology to provide an additional network path between network devices. Such additional links are often included to provide additional resilience to the network, i.e. to enable data packets to be communicated between devices even when a link between the devices is inactive (e.g. physically broken).

However, a loop can give rise to problems on a network. In particular, since there is more than one path between two network devices, data packets may be duplicated, since core network devices, such as switches, will send packets along all possible paths to the destination device, leading to excessive network traffic.

To overcome this problem, a Spanning-Tree Protocol is employed to ensure that only one active path exists between any two network devices. This is achieved by making the other possible paths redundant. A known Spanning-Tree Protocol is defined in the IEEE 802.1D Bridge Protocol standard, which is incorporated herein by reference. The skilled person will appreciate that other suitable Spanning-Tree protocols may be employed.

This Spanning-Tree Protocol (STP) is a link management protocol implemented in managed network devices, in particular, switches. STP defines Spanning-Tree data packets which are exchanged by switches during a negotiation process, as described below. STP additionally defines the following possible states for a port of a switch: blocking; listening; learning; forwarding and disabled. A port in the blocking state discards received data packets, and discards data packets passed to the port by the switch for forwarding, and is thus "inactive". This state is effective to prevent duplication of data packets where two possible paths exist to the destination device. As previously indicated, a problem arises with the above described method of determining network topology by the network management system if loops are present on the network. Even if STP is implemented, prior to completion of the negotiation process, data packets will be passed along the possible different paths to the same network device. Consequently, ports which are eventually placed in the blocking state still learn and store addresses in their address tables at this stage. Thus, in attempting to build a "tree" using the aforementioned method, the network management system will find, for instance, that several devices on different branches of the tree share a child device. The resulting conflicting information can make it impossible to determine the network topology.

The present invention aims to address this problem.

SUMMARY OF THE INVENTION

In accordance with a first aspect, the present invention provides a method for determining the topology of a network in which a Spanning-Tree protocol is implemented, and in which the identity of the devices on the network can be determined, the method comprising the steps of: obtaining address table data for the ports of core network devices on the network, the address table data including the identity of each said port and the addresses of other network devices which the port has learnt; obtaining Spanning-Tree protocol information from one or more of the core network devices; using the Spanning-Tree protocol information, processing the address table data, by removing data relating to ports having links which are in a blocking state, and providing the processed address table data for use to build a network tree to determine a topology of the network.

By removing address table data relating to ports having inactive links, the remaining data corresponds to a network without additional links, leading to loops (i.e. a tree). It is therefore possible to employ a conventional "tree-building" method to determine the network topology without the problems associated with data relating to inactive links.

In a preferred embodiment, the method further includes building a data representation of a network tree. The method preferably thereafter retrieves the previously removed data relating to ports having links which are in the blocking state, and determines links to the ports in the blocking state which may then be added to the network topology so that the true topology of the network is determined.

In accordance with a second aspect, the present invention provides a computer program for implementing the method of the first aspect of the present invention.

In accordance with a third aspect, the present invention provides a network management apparatus for determining the topology of a network in which a Spanning-Tree protocol is implemented, the apparatus comprising: means for obtaining address table data for the ports of the core network devices on the network, the address table data including the identity of each said port and the addresses of other network devices which the port has learnt; means for obtaining Spanning-Tree protocol information from at least one of the core network devices; processing means for processing, using the Spanning-Tree protocol information, the address table data, the processing means for removing data relating to ports having links which are in a blocking state, and means for providing the processed address table data for use to build a network tree to determine a topology of the network.

Other preferred or optional features of the present invention will be apparent from the following description and accompanying claims.

BRIEF DESCRIPTION OF THE DRAWINGS

Embodiments of the present invention will now be described, by way of example, with reference to the accompanying drawings, in which.

DESCRIPTION OF THE PREFERRED EMBODIMENTS

Figure 1:
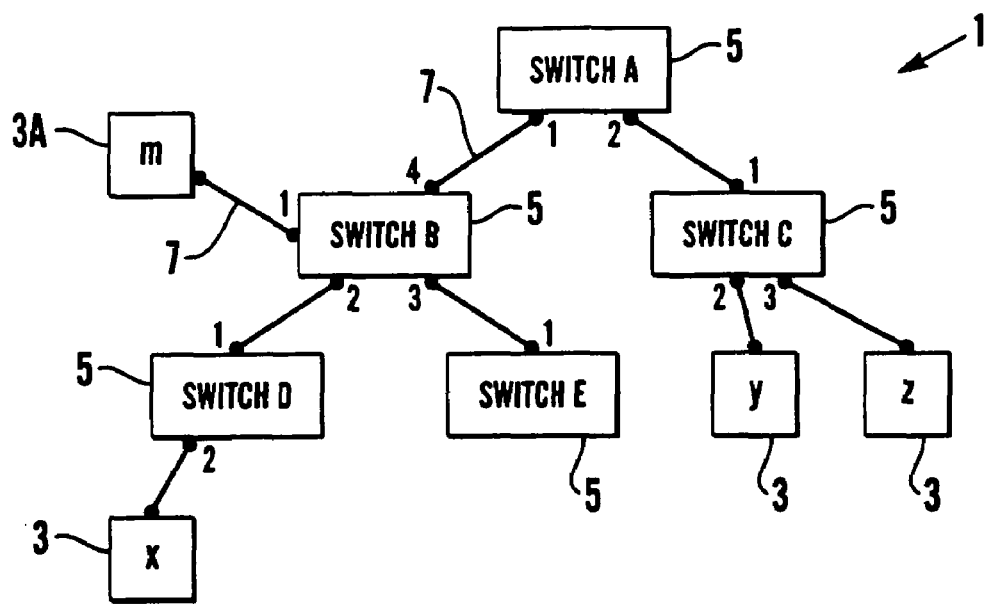
FIG. 1 is a block diagram of a conventional network having a tree structure.

FIG. 1 shows a conventional local area network 1, comprising a plurality of network devices including endstations 3 with identifiers m, x, y and z, Switches 5 with identifiers A, B, C, D and E, and links 7. The endstation 3A with identifier m is designated the management station and includes the necessary hardware and software applications for network management, as well known in the art. In particular, the management station 3A includes network management software for determining the topology of the network by building a network tree, as described above, and a display screen for displaying a graphical representation or "map" illustrating the determined topology.

Figure 2:
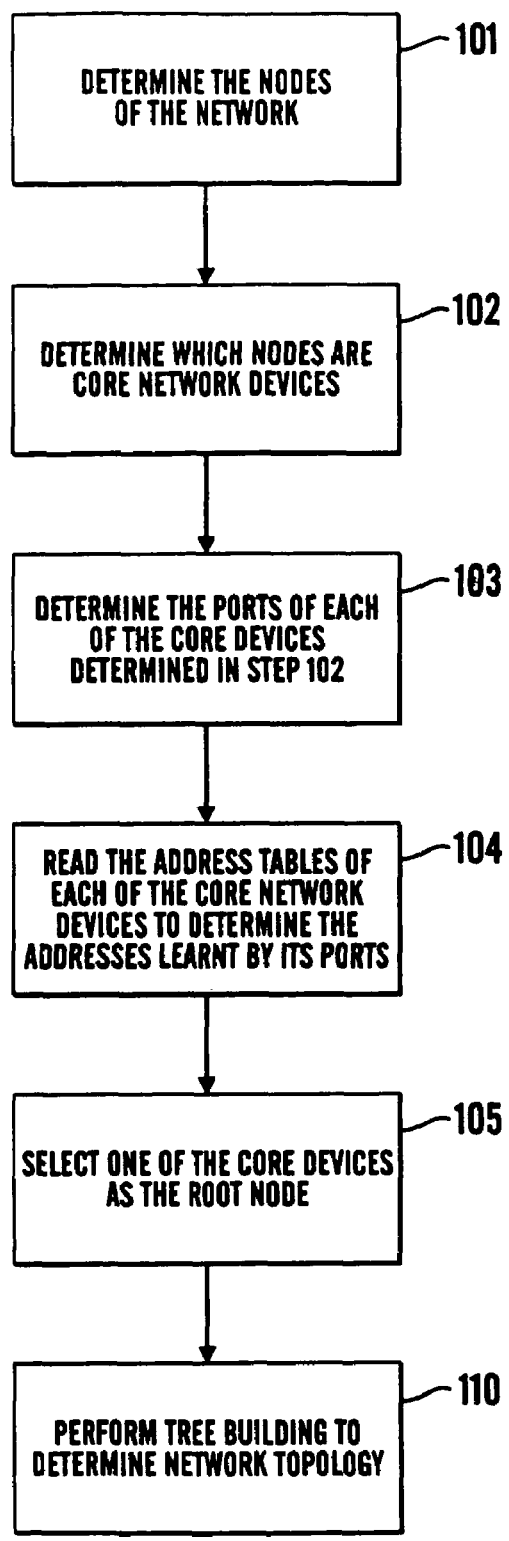
FIG. 2 is a flow diagram of a conventional method for determining the topology of the network of FIG. 1.

FIG. 2 illustrates a conventional method which can be used to determine the topology of a network in the form of a tree, such as the network shown in FIG. 1. The method is typically implemented in a computer program which forms part of a network management software application running on the network management station. The program initially retrieves network management information (e.g. MIB data)

from managed network devices using, for example, SNMP commands in order to determine the identity and type of the devices on the network.

The network management data also includes the address tables described above. As is well known in the art, various types of SNMP MIB data address tables are known. One such address table is defined in RFC 1493 "Definitions of Managed Objects for Bridges". Proprietary address tables are also known. The present invention can be implemented using any of these address tables.

The retrieved network management data is stored in a data storage, such as a database, and is then used to perform the following steps.

In step 101, the identity of all the nodes (devices) on the network is determined from the retrieved data, and step 102 determines which of the nodes are core network devices (i.e. devices which connect to more than one other device, as opposed to endstations which connect to only one other network device).

In step 103, the program determines the identity of the ports of each of the core network devices, and in step 104 the Address Tables of all the ports determined in step 103 are read. It will be appreciated that the Address Table data may be read during the initial stages of the program (not shown) and stored in the aforementioned data storage, in which case step 104 merely retrieves the relevant data from the data storage.

Thus, steps 101 to 104 produce a data Table for each of the core network devices, i.e. the switches 5, of the network 1 of FIG. 1. Each Table indicates the identity (address) of the each of the ports of the switch 5 and the addresses of other network devices learnt by that port.

For example, for Switch B, the method will construct the following Table 1:

| Port of Switch B | Child nodes |
|---|---|
| B1 | m |
| B2 | D x |
| B3 | E |
| B4 | A C y z |

In step 105, the program selects one of the core network devices as a root node. Various methods for selecting the most appropriate device as the root node are known, and for the purposes of the present description any appropriate method may be employed.

At step 110, the program performs a "tree-building" algorithm to determine the immediate children of the ports of the root node (i.e. the devices immediately connected to or "facing" each port) and the children of each child node, if any. The topology of the network 1 can thus be constructed and presented to the network administrator, for example by display on the display screen of the network management station 3A.

Figure 3:
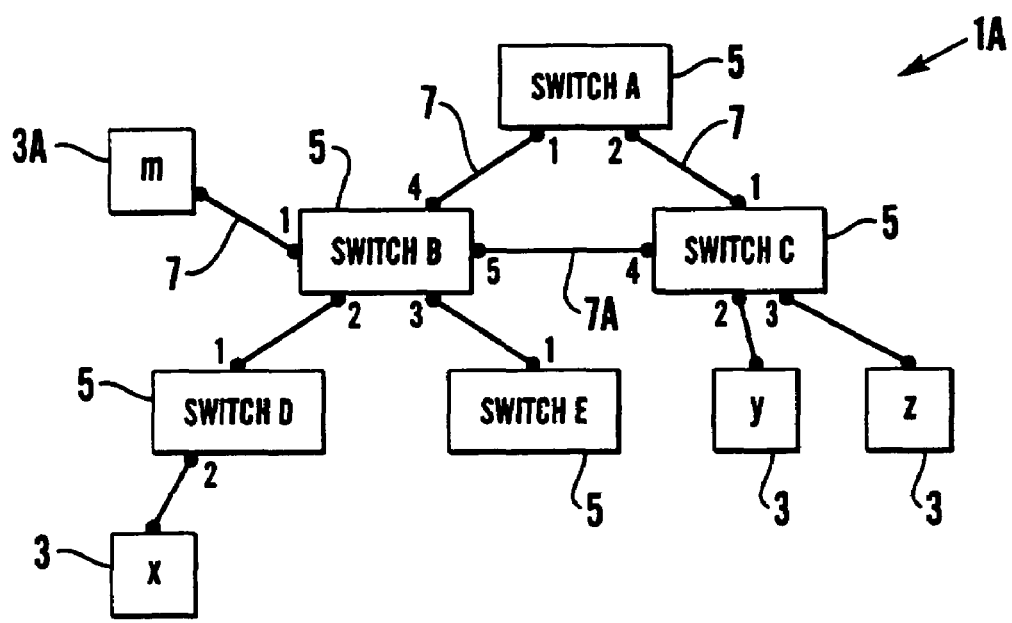
FIG. 3 is a block diagram of a network, similar to the network of FIG. 1, but with an additional link which forms a loop.

FIG. 3 shows an example of a local area network 1A in accordance with the present invention. It will be appreciated that the illustrated network is simplified for the purposes of this description, and that many other possible network arrangements are possible. The network 1A is identical to the network 1 of FIG. 1, except that it has an additional link 7A. Link 7A provides a direct connection between Switch B and Switch C. This forms a loop between Switch A, Switch B and Switch C. In order to avoid the duplication of data packets forwarded between these Switches, the network 1A implements STP. By enabling STP on Switches A, B and C, the switches perform negotiation whereby they communicate with each other, using STP, to determine where the loop exists and to "block" one or more ports to prevent the loop from causing data replication.

For example, suppose that as a result of the STP negotiation process, Switches A, B and C elect to place port 5 of Switch B in the "blocking state", therefore preventing data packets from being passed from that port along link 7A. At the other end of link 7A, port 4 of Switch C is placed in the "forwarding state" in accordance with the STP negotiation process. In the forwarding state, a port forwards received and switched data packets and responds to network management messages. The link 7A is effectively inactive because port 5 of switch B is in the "blocking state", and the network 1A passes data packets in the same way as the network topology of network 1 of FIG. 1.

However, prior to completion of the negotiation process, port 5 of Switch B may have learnt the addresses of endstations y and z from communications from endstations y and z to endstations m and x, and port 4 of Switch C may similarly have learnt the addresses of endstations m and x from communications from endstations m and x to endstations y and z This may lead to conflicts in the address tables of the ports of Switches B and C which will make it impossible for the tree-building algorithm to determine the topology of the network.

Accordingly, in order to determine the topology of network 1A, the method of the present invention is employed.

Figure 4:
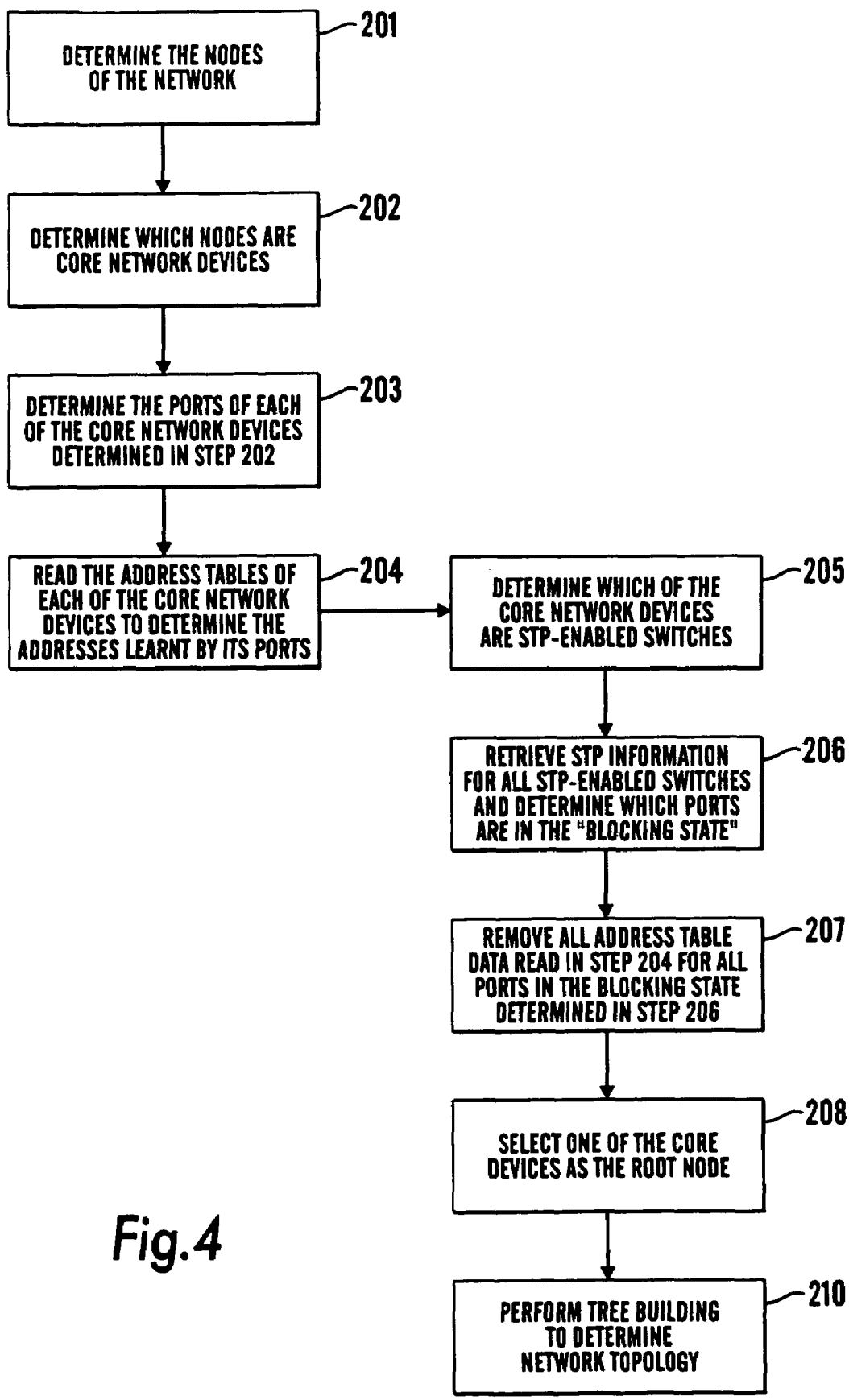
FIG. 4 is a flow diagram of a method for determining the topology of the network of FIG. 3, in accordance with a preferred embodiment of the present invention.

FIG. 4 illustrates the method for determining the topology of network 1A in accordance with a preferred embodiment of the present invention. The method of the preferred embodiment is implemented in the form of a computer program which is part of a network management software application for running on a network management station. The computer program may be provided on a magnetic or optical disk for loading onto the network management station or downloaded over a suitable communications medium from a website, for example. It will be appreciated that the method may also be implemented in other forms such as hardware.

As shown in FIG. 4, the method includes steps similar to the method of FIG. 2. Prior to the illustrated steps, the program initially retrieves network management information (MIB data) from managed network devices using SNMP commands to determine inter alia the identity of devices on the network. The retrieved network management data is stored in a data storage, such as a database, and is then used to perform the following steps.

In step 201, the identity of all the nodes (devices) on the network is determined from the retrieved data. The identity of a node includes at least its network addresses (MAC address and, if appropriate, IP address). In determining the identity of the nodes in step 210, the program typically creates a "node list" which is stored in the aforementioned database for use in determining the network topology, as will be appreciated from the following. At step 202 the program determines which of the nodes are core network devices (i.e. devices which connect to more than one other device, as opposed to endstations which connect to only one other network device). It is possible to determine which of the nodes are core network devices using information retrieved in response to well known SNMP commands from the network management station 3A, which information is stored in the database.

In step 203, the program determines the identity of the ports of each of the core network devices. In particular, the program establishes from the data in the database, for each core network device, the number of ports, the identity of the ports and whether they are enabled (i.e. whether they have a valid fink and are therefore connected to another device). The details of the ports for each core network device, determined in step 203, is added to the "node list" for future use. In step 204 the SNMP Address Tables, for all of the ports determined in step 203, are read using SNMP commands, and the data stored alongside the "node list" in the database. It Will be appreciated that the Address Table data may be read during the initial stages of the program (not shown) and stored in a different area of the aforementioned data storage, in which case step 204 merely retrieves the relevant data from the data storage and places it with the "node list".

Thus, steps 201 to 204 produce a data Table for each of the core network devices, i.e. the switches 5, of the network 1A of FIG. 3. Each Table indicates the identity (address) of the each of the ports of the switch 5 and the addresses of other network devices learnt by that port.

For example, for Switch B, the method may construct the following Table 2:

| Port of Switch B | Child nodes |
| --- | --- |
| B1 | m |
| B2 | D x |
| B3 | E |
| B4 | A C y |
| B5 | z |

Port 4 of Switch B has learnt the addresses of Switches A and C and endstation y, but not endstation z. The address of endstation z is instead learnt by port 5 since, due to the random nature of switching at the initial stage, prior to completion of negotiation, data packets from endstation z were switched by Switch C to port 5 of Switch B, and thus, seen and learnt by port 5 of Switch B.

At the same time, for Switch C, the method may construct the following Table 3:

| Port of Switch C | Child nodes |
| --- | --- |
| C1 | A B D E m x |
| C2 | y |
| C3 | z |
| C4 | — |

Thus, it can be seen from Tables 2 and 3 that there is conflicting information relating to the connections between Switch B, Switch C and device z, due to the loop resulting from link 7A. If the tree-building algorithm were now to be employed in accordance with the method of FIG. 2, it would not be possible to resolve the topology of the network.

Accordingly, instead of proceeding immediately with the tree-building algorithm, the method of FIG. 4 continues with step 205 which determines which core network devices are STP-enabled and at step 206 by retrieving STP information, as described below, from all the STP-enabled network devices determined in step 205. This STP information is determined during Spanning-Tree negotiation and subsequently stored by all STP-enabled devices, i.e. in the case of network 1A the Switches A, B and C.

In particular, during Spanning-Tree negotiation, each device (switch) advertises itself using a unique ID, called the "Bridge ID" (normally based on MAC address). In addition each device assigns a unique ID to each of its ports, the "Port ID". At the end of negotiation, one of the ports at the end of a link is designated as the Designated Port and its Bridge ID and Port ID are respectively adopted as the Designated Bridge ID and the Designated Port ID for both ports connected to the link. Thus, two ports, which are directly connected together, have the same Designated Bridge ID and Designated Port ID. The STP information thus contains the Designated Bridge ID and the Designated Port ID for each port of each STP enabled network device.

In addition, the STP information includes the states of each of the ports of the devices as determined by the Spanning Tree negotiation process.

Further details about STP information, and in particular the Designated Bridge and Designated Port IDs can be found in the RFC 1493"Definitions of Managed Objects for Bridges" which is incorporated herein by reference.

At step 207 the program determines all ports which are in the blocking state and removes from the Address Tables data relating to all ports in the blocking state. Thus, for example, for the address list relating to Switch B set out in Table 2 above, the data relating to port 5 will be removed, since port 5 is in the blocking state.

Whilst the learnt addresses for ports removed in step 207 may be discarded, in accordance with the preferred embodiment of the present invention this data is retained, by storage in the data storage or otherwise, for further use, as outlined below.

Following step 207, the address list for Switch B will correspond to the list of Table 1, since all data relating to the blocked port has been discarded. The data remaining thus represents a network having a tree configuration (i.e. without any loops), and the data can be processed using a conventional tree-building algorithm.

At step 208 the method selects the root node as described above. The manner of selection is not significant to the present invention, and any suitable method may be employed.

Accordingly, at step 210 the program performs a tree-building algorithm, using the data resulting from step 207, to determine the topology of the network. Any suitable algorithm may be employed for this purpose and many techniques are known as discussed previously.

The result of the topology determination will correspond to the topology of the network 1A but without the additional link 7A. This topology may be sufficient for the needs of the network management application and may be presented to the network administrator. This is achieved by creating, a data representation of a connection or link between each port in the tree that has a child. Each connection item will have two pieces of information associated with it—the device and port of the parent and the device and port of the child. A child device that is an endstation will not have a port. Thus, a list of connections is created which can be stored in the database and presented to the network administrator in the desired format.

Figure 5:
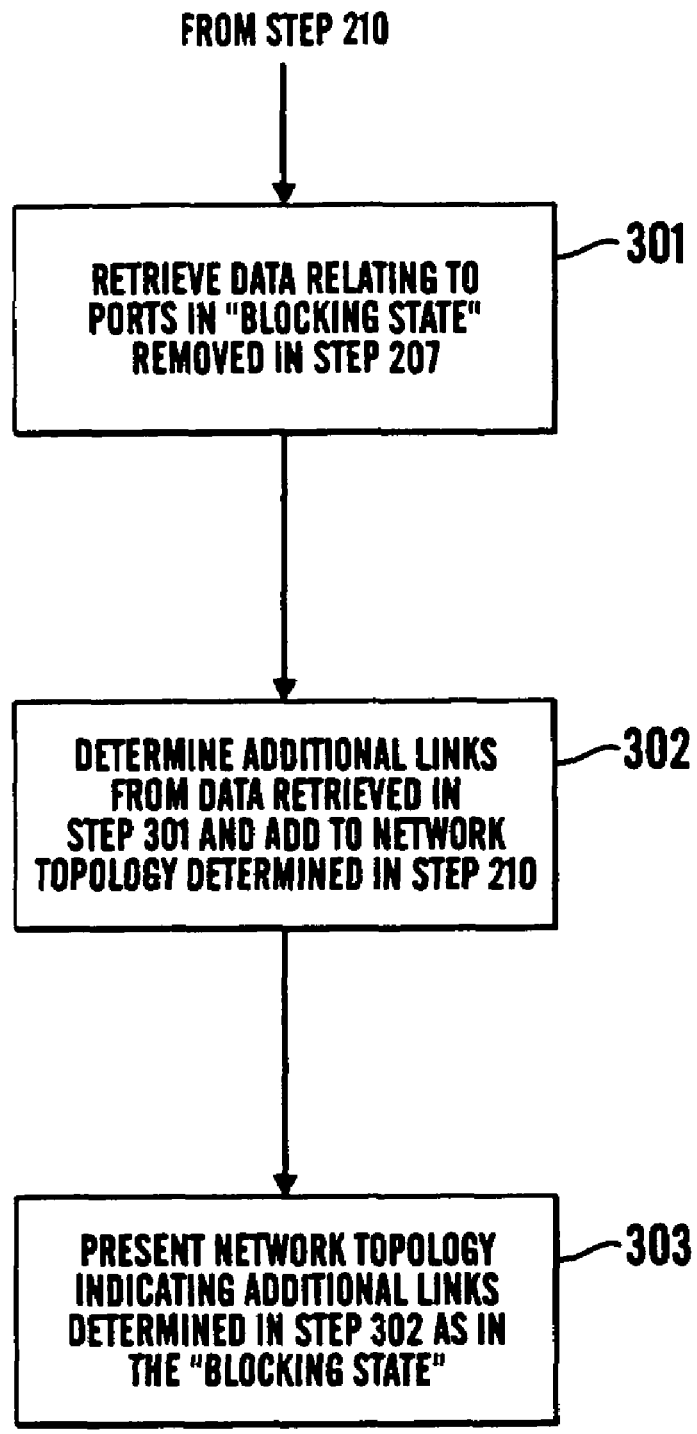
FIG. 5 is a flow diagram showing a method for presenting the topology of the network determined by the method of FIG. 4.

In accordance with the preferred embodiment, however, and in order to present the network administrator with the true topology of the network, the program continues with the program steps illustrated in FIG. 5.

In step 301, the program retrieves the data removed in step 207 of FIG. 4, i.e. the data relating to all ports which are in the blocking state. At step 302 the program determines from the retrieved data the additional links, which are inactive due to one of the ports at the end of the link being in the blocking state. This is achieved by matching each port in the blocking state with the port at the other end of the inactive link. As indicated above, the STP information includes the Designated Bridge ID and the Designated Port ID for each port, and as a result of the STP negotiation process, ports at each end of an inactive link have the same Designated Bridge ID and Designated Port ID. Thus, the program can simply construct the additional inactive links by pairing ports having the same Designated Bridge and Designated Port IDs using the STP information.

At step 303, the program presents the network topology, indicating the additional links as in the inactive or blocking state. The network topology may be presented on the display screen of the network management station 3A or may be printed from the station 3A using a printer. The network topology may be presented graphically in the form of a network map, with icons for devices and lines for links, as is well known in the art, in which case the additional links may be represented by lines of a different form (e.g. dotted lines) or colour. Alternatively, the network topology may be presented as a list of connections, e.g. "Switch A, port 2 connected to Switch C, port 1", in which case the inactive connections can be indicated as blocked, e.g. "Switch B, port 5 (blocked) connected to Switch C, port 4".

It will be appreciated from above that in accordance with the preferred embodiment, the present invention is implemented in the form of a computer program which may be included on a computer readable medium such as a disk, and which may be loaded in the disk drive of the network management station 3A. The network management station 3A typically comprises a processor, a disk drive, memory, and user interfaces including a display screen, keyboard, mouse, and a printer. The computer program described above is typically loaded onto the network management station using the disk drive and processor runs the program. Alternatively, the computer program may be carried on a computer system having the website of, for example, the supplier of network devices, which permits downloading of the program over the Internet on a carrier wave to the network management station 3A.

As the skilled person will appreciate, various changes and modifications may be made to the described embodiments. It is intended to include all such variations, modifications and equivalents which fall within the spirit and scope of the present invention as defined in the accompanying claims.

The invention claimed is:

1. A method for use in determining the topology of a network in which a Spanning-Tree protocol is implemented, and in which the identity of the devices on the network can be determined, the method comprising the step of:
   obtaining address table data for the ports of core network devices on the network, the address table data including the identity of each said port and the addresses of other network devices which the port has learnt;
   obtaining Spanning-Tree protocol information from one or more of the core network devices;
   using the Spanning-Tree protocol information, processing the address table data, by removing data relating to ports which are in a blocking state;
   providing the processed address table data for use to build a network tree to determine a topology of the network; and
   building a data presentation of the network tree without the data relating to ports in the blocking state, thus determining a topology of the network
   wherein the step of removing comprises storing the removed data in memory so that the removed data may be utilized for determining links for ports in the blocking state.

2. A method as claimed in claim 1, wherein the step of removing comprises determining the ports that are in the blocking state, and removing address table data of those ports.

3. A method as claimed in claim 1, further comprising presenting the determined topology of the network.

4. A method as claimed in claim 3, wherein, prior to the step of presenting, the method further comprises the step of retrieving the removed data from memory, and determining links for the ports in the blocking state.

5. A method as claimed in claim 4, wherein the Spanning-Tree protocol information includes a Designated Bridge identifier and a Designated Port identifier, and said step of determining links for the ports in the blocking state comprises matching pairs of ports having the same Designated Bridge and Designated port identifiers and determining a link between each matched pair of ports.

6. A method as claimed in claim 1, further comprising adding the determined links for the ports in the blocking state into the network topology.

7. A method as claimed in claim 1, wherein the step of obtaining the Spanning-Tree protocol information comprises, identifying the core network devices in which the Spanning-Tree protocol is enabled, and retrieving the Spanning-Tree protocol information from the identified core network devices.

8. A method as claimed in claim 1, wherein, prior to the step of obtaining address table data, the method comprises:
   determining the identity of the core network devices on the network;
   determining the identity of the ports of the core network devices; and
   reading the address tables of the ports of the core network devices.

9. A method as claimed in claim 1, wherein the step of determining the identity of the core network devices includes sending an SNMP data request onto the network, and receiving and processing the response.

10. A computer program embedded in a computer readable medium, for use in determining the topology of a network in which a Spanning-Tree protocol is implemented, and in which the identity of the devices on the network can be determined, the program comprising:
   a program step for obtaining address table data for the ports of core network devices on the network, the address table data including the identity of each said port and the addresses of other network devices which the port has learnt;
   a program step for obtaining Spanning-Tree protocol information from one or more of the core network devices;
   a program step for processing the address table data, by removing data relating to ports which are in a blocking state, said ports being determined using the Spanning-Tree protocol information;
   a program step for providing the processed address table data for use to build a network tree without the data relating to ports in the blocking state to determine a topology of the network, and
   a program step for building a data representation of the network tree, thus determining a topology of the network
   wherein removing data comprises storing the removed data in memory so that the removed data may be utilized for determining links for ports in the blocking state.

11. A network management apparatus for determining the topology of a network in which a Spanning-Tree protocol is implemented, the apparatus comprising:
- means for obtaining address table data for the ports of the core network devices on the network, the address table data including the identity of each said port and the addresses of other network devices which the port has learnt;
- means for obtaining Spanning-Tree protocol information from a least one of the core network devices;
- processing means for processing, using the Spanning-Tree protocol information, the address table data, the processing means for removing data relating to ports having links which are in a blocking state;
- means for providing the processes address table data for use to build a network tree to determine a topology of the network, and
- means for building a data representation of the network tree without the data relating to ports in the blocking state, thus determining a topology of the network wherein the step of removing comprises storing the removed data in memory so that the removed data may be utilized for determining links for ports in the blocking state.

12. An Apparatus as claimed in claim 11, further comprising memory for storing data for use in determining the network topology.

13. An apparatus as claimed in claim 12, further comprising a display screen and/or a printer for presenting the determined topology of the network.

* * * * *